(12) United States Patent
Duchane et al.

(10) Patent No.: US 6,495,112 B2
(45) Date of Patent: Dec. 17, 2002

(54) METHOD AND APPARATUS FOR REMOVING OXYGEN FROM NATURAL GAS

(75) Inventors: David V. Duchane, Sante Fe, NM (US); William R. Parrish, Bartlesville, OK (US); Douglas W. Hausler, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 131 days.

(21) Appl. No.: 09/810,684

(22) Filed: Mar. 16, 2001

(65) Prior Publication Data

US 2002/0159937 A1 Oct. 31, 2002

(51) Int. Cl.[7] .................................................. C10L 3/10
(52) U.S. Cl. ................... 423/219; 423/390.1; 423/393; 423/396; 423/400; 48/127.3; 48/127.5
(58) Field of Search ........................... 48/127.3, 127.5; 423/219, 390.1, 393, 396, 400

(56) References Cited

U.S. PATENT DOCUMENTS

| | | | | |
|---|---|---|---|---|
| 3,512,925 A | * | 5/1970 | Buechler et al. | 23/2 |
| 4,025,321 A | * | 5/1977 | Anderson et al. | 55/33 |
| 4,299,800 A | * | 11/1981 | Nishikawa et al. | 423/219 |
| 5,057,291 A | | 10/1991 | Fisher et al. | 423/219 |
| 5,607,572 A | | 3/1997 | Joshi | 205/763 |
| 5,985,230 A | * | 11/1999 | Vlaming et al. | 423/392 |

* cited by examiner

Primary Examiner—Stanley S. Silverman
Assistant Examiner—Timothy C Vanoy
(74) Attorney, Agent, or Firm—Kameron D. Kelly

(57) ABSTRACT

Oxygen is removed from natural gas by contacting oxygen-containing natural gas with nitric oxide under conditions sufficient to produce nitrogen dioxide.

16 Claims, 3 Drawing Sheets

METHOD AND APPARATUS FOR REMOVING OXYGEN FROM NATURAL GAS

BACKGROUND OF THE INVENTION

This invention relates generally to the field of natural gas production, transportation, and processing. In one aspect, this invention relates to a method of removing oxygen from natural gas. In another aspect, this invention relates to an apparatus for removing oxygen from natural gas.

Natural gas is one of the most popular forms of energy today. It is used for heating, cooling, production of electricity, and it finds many uses in industry. Natural gas is produced, sometimes along with oil, by drilling into the earth's crust to locate subterranean deposits of natural gas. In most natural gas fields, the subterranean natural gas deposits are under sufficient pressure that the natural gas will flow freely to the earth's surface. In some older natural gas fields, however, a lifting system is required to extract natural gas from the subterranean formation.

One common problem associated with the production of natural gas is the presence of oxygen in natural gas. Typically, oxygen enters the natural gas via air leaks in the production or transportation system. Air leaks are primarily a problem in the portions of the system where natural gas is maintained at less than atmospheric pressure. When a lifting system is required to draw the natural gas out of the ground, the natural gas located between the subterranean natural gas deposit and the initial pipeline booster compressor typically has a pressure which is less than atmospheric pressure. In these subatmospheric pressure regions, air is naturally drawn into the system through even the smallest of openings due to the pressure differential between the conduit carrying the natural gas and the atmosphere.

Although oxygen typically enters natural gas near the upstream production and transportation end of the system, the negative impacts of oxygen in natural gas are apparent throughout the midstream and downstream transportation and processing regions. Problems associated with the presence of oxygen in natural gas include the following: (1) oxygen contributes substantially to the corrosion of piping used to transport the natural gas from the gathering wells to the gas plant, (2) during regeneration of molecular sieves at the gas plant, oxygen reacts with hydrocarbons and hydrocarbon residues to produce char which plugs and coats the molecular sieves, thereby reducing the life of the molecular sieves, (3) oxygen contributes to the deterioration of amine fluids used in the gas plant to remove acid gasses from the natural gas stream, and the salts generated as a result eventually precipitate or cause foaming in the treaters of the gas plant, and (4) purchasers of natural gas recognize the problems associated with the presence of oxygen in natural gas and, therefore, impose a penalty on the price they will pay for gas containing excessive amounts of oxygen.

In the past, operators of natural gas facilities have attempted to lower oxygen levels in natural gas by seeking out and repairing air leaks in the production and transportation systems. However, even with these preventative measures, oxygen levels of greater than 50 ppmv (parts per million by volume) in natural gas are common.

OBJECTS AND SUMMARY OF THE INVENTION

It is therefore an object of the present invention to provide a system for removing oxygen from natural gas.

A further object of the present invention is to provide a system for removing oxygen from natural gas which does not require expensive reactors, separators, chemicals, and/or catalysts.

A still further object of the present invention is to provide a system which converts the oxygen in natural gas into a marketable compound which is easily separable from natural gas.

Additional objects and advantages of the invention will be apparent in the description which follows and the appended claims.

In accordance with an embodiment of the present invention, a method for removing oxygen from natural gas is provided. The method comprises contacting a volume of oxygen-containing natural gas with nitric oxide under conditions sufficient to produce nitrogen dioxide.

In accordance with another embodiment of the present invention, an apparatus for removing oxygen from natural gas is provided. The apparatus comprises a natural gas line for transporting natural gas, a nitric oxide source, and a nitric oxide injector fluidically coupled to the natural gas line and the nitric oxide source. The nitric oxide injector is operable to conduct nitric oxide from the nitric oxide source into the natural gas line.

The present invention provides a simple and economical system for the in-line removal of oxygen from natural gas. The by-products of the inventive system are marketable compounds which are easily separable from natural gas.

BRIEF DESCRIPTION OF THE DRAWING FIGURES

Preferred embodiments of the invention are described in detail below with reference to the attached drawing figures, wherein.

DETAILED DESCRIPTION OF THE PREFERRED EMBODIMENTS

Figure 1:
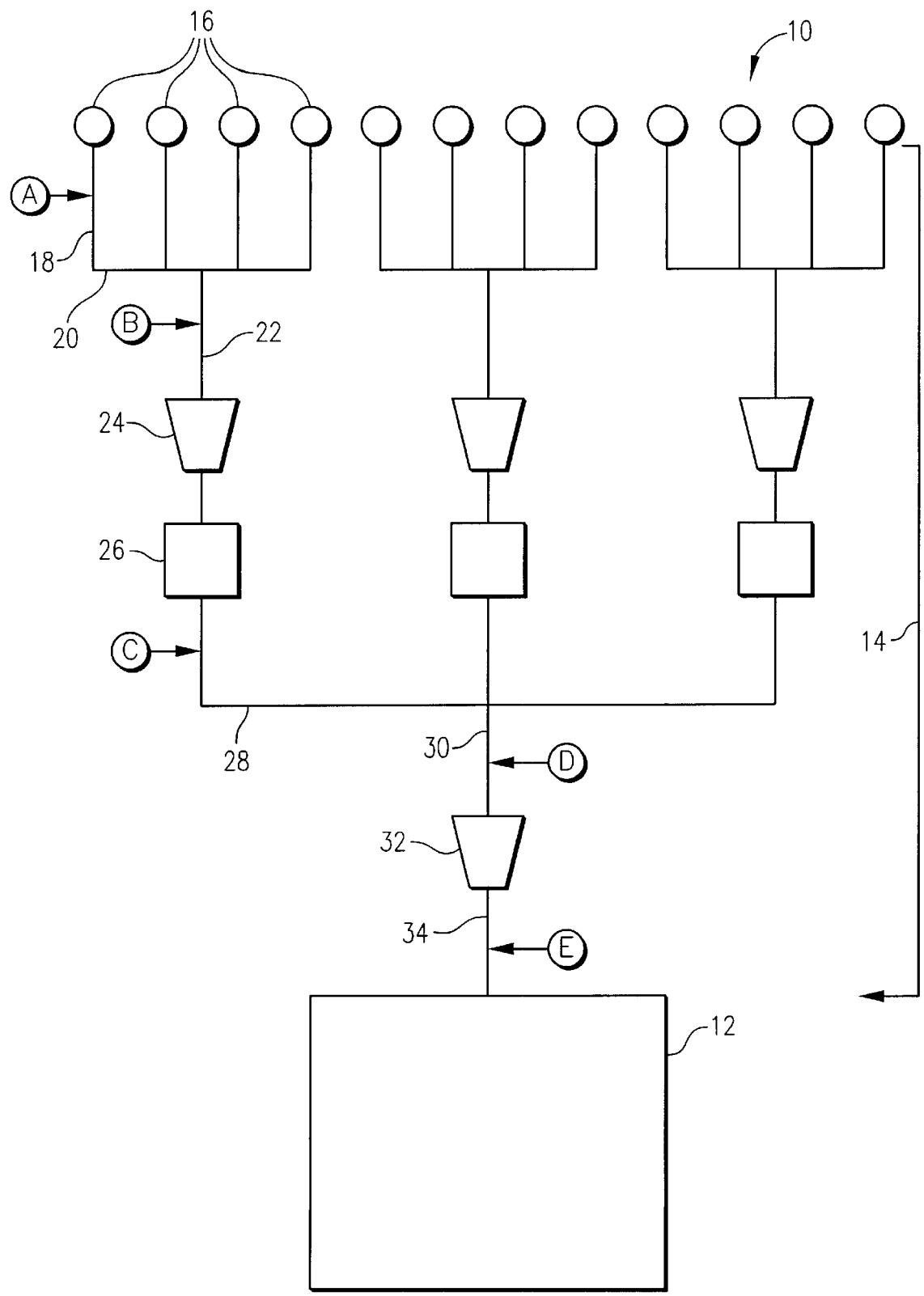
FIG. 1 is a diagram showing a natural gas production, transportation, and processing system.

In accordance with the present invention, oxygen is removed from oxygen-containing natural gas by contacting the oxygen-containing natural gas with nitric oxide under conditions sufficient to produce nitrogen dioxide.

The natural gas employed in the present invention can be any natural gas stream containing an undesirably high level of oxygen. The oxygen-containing natural gas stream is preferably natural gas being transported from a natural gas production field to a natural gas processing facility. The oxygen-containing natural gas stream typically comprises hydrocarbons such as methane, ethane, propane, butane, and pentanes, as well as other compounds such as carbon dioxide, helium, hydrogen sulfide, nitrogen, water, and oxygen. Preferably, the oxygen-containing natural gas stream comprises more than 70 volume percent methane by volume of the total natural gas stream. More preferably, the oxygen-containing natural gas stream contains from 80 volume percent to 99 volume percent methane, most preferably from 90 volume percent to 97 volume percent methane. The oxygen-containing natural gas stream preferably contains less than 30 volume percent of hydrocarbons other than methane. More preferably, the oxygen-containing natural gas stream contains from 1 volume percent to 20 volume percent hydrocarbons other than methane, most preferably from 3 volume percent to 10 volume percent hydrocarbons other than methane. The natural gas stream preferably contains more than 50 ppmv (parts per million by volume of the entire natural gas stream) oxygen. More preferably, the oxygen-containing natural gas stream contains from 50 ppmv to 10,000 ppmv oxygen, most preferably from 100 ppmv to 2000 ppmv oxygen.

The oxygen-containing natural stream which is treated by the present inventive system can be flowing through a gas line at a flow rate from 100 scf/day (standard cubic feet per day) to 200 million scf/day, more preferably from 1000 scf/day to 100,000 scf/day. The pressure of the oxygen-containing natural gas stream which is treated by the present inventive system can vary widely from sub-atmospheric pressures up to 10,000 psig. Preferably, the pressure of the oxygen-containing natural gas stream is from 0 psig to 2000 psig, most preferably from 200 psig to 1500 psig. The temperature of the oxygen-containing natural gas stream which is treated by the present inventive system is preferably from −20° F. to about 200° F., more preferably, the temperature of the oxygen-containing natural gas stream is from 20° F. to 120° F.

The nitric oxide contacted with the oxygen-containing natural gas stream in accordance with the present invention can come from any suitable source. Preferably, the nitric oxide is produced on-site by the partial oxidation of ammonia in a suitable reactor. Ammonia can be oxidized on-site by contacting it with air to make nitric oxide and water according to the following equation:

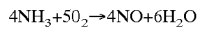

$$4NH_3 + 5O_2 \rightarrow 4NO + 6H_2O$$

The oxidation of ammonia preferably takes place at elevated temperatures, moderate pressures, and in the presence of a metallic catalyst. The ammonia oxidation reaction temperature is preferably from 100° C. to 1200° C., more preferably from 250° C. to 1000° C. The ammonia oxidation reaction pressure is preferably from 0 psig to 100 psig, more preferably from 25 psig to 75 psig. The ammonia oxidation reaction catalyst can be any suitable catalyst known in the art, preferably a platinum-containing catalyst.

Because the ammonia oxidation reaction is highly exothermic, the reaction is typically cooled by employing an excess of air in the reaction. However, in the present invention, it is preferred that an excess of ammonia be employed in the oxidation reaction so that a quantity of unreacted ammonia passes through the ammonia oxidation reactor and is injected along with the nitric oxide into the oxygen-containing natural gas stream. Because of the highly exothermic nature of the ammonia oxidation reaction, care must be taken to prevent overheating of the system when the ammonia oxidation reaction is carried out with an excess of ammonia.

The water produced in the ammonia oxidation reaction can be injected into the oxygen-containing natural gas stream along with the nitric oxide. The water can then be removed from the oxygen-containing natural gas downstream from the nitric oxide injection point. Alternatively, the water produced in the ammonia oxidation reaction can be separated from the nitric oxide prior to contacting the nitric oxide with the oxygen-containing natural gas stream. Any gas/liquid separator known in the art can be used to separate the water from the nitric oxide.

The nitric oxide is preferably contacted with the oxygen-containing natural gas stream while the natural gas stream is flowing in a natural gas transportation pipeline. Thus, the present invention is advantageous because it does not require installation of an additional reactor to remove the oxygen from natural gas, rather the required reaction takes place in-line. The nitric oxide is injected into the pipeline using standard injection techniques which allow the nitric oxide to be well dispersed in the oxygen-containing natural gas flowing through the pipeline. Suitable injection methods include, for example, atomization and sparging.

The amount of nitric oxide injected into the oxygen-containing natural gas stream varies depending on the amount of oxygen in the natural gas stream. Preferably, nitric oxide is injected into the oxygen-containing natural gas stream in an amount sufficient to provide from 0.5 moles to 10 moles of nitric oxide per mole of oxygen in the natural gas stream. More preferably, nitric oxide is injected in an amount sufficient to provide from 1 mole to 5 moles of nitric oxide per mole of oxygen, most preferably from 2 moles to 5 moles of nitric oxide per mole of oxygen.

When the nitric oxide is contacted with the oxygen-containing natural gas stream, the nitric oxide reacts with the oxygen in the natural gas stream to form nitrogen dioxide. This reaction can be represented by the following equation:

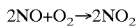

$$2NO + O_2 \rightarrow 2NO_2$$

The nitric oxide/oxygen reaction can take place at standard pipeline conditions, described above. Thus, the present invention has the advantage of not requiring external temperature adjustments, pressure adjustments, and/or catalysts in order to remove oxygen from natural gas.

The nitrogen dioxide formed by the above-described reaction can be immediately removed from the natural gas stream by any means known in the art. It is preferred, however, that the nitrogen dioxide be maintained in the natural gas stream for a period of time sufficient to allow the nitrogen dioxide to react with water present in the natural gas stream, to thereby form nitric acid. The nitric acid is formed primarily through reactions which can be represented by the following equations:

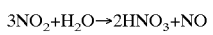

$$3NO_2 + H_2O \rightarrow 2HNO_3 + NO$$

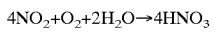

$$4NO_2 + O_2 + 2H_2O \rightarrow 4HNO_3$$

The formation of nitric acid from nitrogen dioxide and water can take place at standard natural gas pipeline conditions, described above, without requiring external temperature adjustments, pressure adjustments, and/or catalysts.

The nitric acid formed by the above-described reaction can be removed from the natural gas stream by any means known in the art. Preferably, nitric acid exists in the natural gas stream as a concentrated liquid solution in water and can be removed from the natural gas stream by standard gas/liquid separation techniques known in the art.

In an alternative embodiment, the nitric acid is maintained in the natural gas stream for a period of time sufficient to allow the nitric acid to react with ammonia to form ammonium nitrate. The ammonium nitrate is primarily formed according to the following equation:

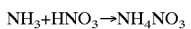

$$NH_3 + HNO_3 \rightarrow NH_4NO_3$$

The ammonia reacted with nitric acid to form ammonium nitrate can be injected upstream, downstream, or along with the nitric oxide injection. Preferably, the ammonia is injected downstream from, or along with, the nitric oxide injection. Most preferably, the ammonia is injected along with the nitric oxide. As described above, ammonia is already present in the injected nitric oxide if the ammonia oxidation reaction employs an excess of ammonia.

The amount of ammonia added to the natural gas stream varies depending on the amount of oxygen in the natural gas stream. Preferably, ammonia is added to the natural gas stream in an amount sufficient to provide from 0.5 moles to 10 moles of ammonia per mole of oxygen in the natural gas stream measured immediately upstream from the nitric oxide injection point. More preferably, ammonia is added to the natural gas stream in an amount sufficient to provide from 1 mole to 5 moles of ammonia per mole of oxygen, most preferably from 2 moles to 3 moles of ammonia per mole of oxygen.

After ammonium nitrate is formed by the above-described reaction, it can be removed from the natural gas stream by any means known in the art. Preferably, the ammonium nitrate is present in the natural gas stream in a liquid solution in water, and is removed form the natural gas stream by standard gas/liquid separation techniques known in the art.

Referring now to FIG. 1, the present is especially useful for removing oxygen from natural gas which is being transported from a gas production field 10 to a gas processing plant 12 via a gas transportation system 14.

Gas production field 10 typically comprises a plurality of wellheads 16 where natural gas is lifted to the surface. The lifting mechanism at wellheads 16 is typically a conventional rod pump. Frequently, a mixture of oil and natural gas is pumped to the surface at wellheads 16. After reaching the surface, the oil and natural gas are separated, with the oil being sent to an oil line, not shown, and the natural gas being sent to an upstream gas line 18. Alternatively, the gas flows to the surface due to natural reservoir pressure. The natural gas then travels from upstream gas line 18 to an initial manifold 20 where the natural gas from a plurality of wellheads 16 is combined and conducted through a midstream gas line 22. An initial booster compressor 24 is disposed in midstream gas line 22. Initial booster compressor 24 is operable to raise the pressure of the natural gas stream. Typically, the natural gas located upstream from initial booster compressor 24 is at a pressure less than atmospheric pressure. Initial booster compressor 24 preferably increases the pressure of the natural gas from subatmospheric pressure to greater than atmospheric pressure. More preferably, initial booster compressor raises the pressure of the natural gas to a pressure of from 20 psig to 50 psig. Compressing the natural gas increases transportation efficiency by reducing the volume of the natural gas, therefore allowing more natural gas to flow through a pipeline of given size. After initial booster compressor 24, the natural gas flows to a gas/liquid separator 26 where water and other liquids are removed from the natural gas. The natural gas is then conducted to a final manifold 28 where natural gas from a plurality of midstream gas lines 22 is combined. Final manifold 28 is connected to gas plant 12 via a downstream gas line 30, a final booster compressor 32, and a plant supply line 34. In gas plant 12, the natural gas stream is subjected to a variety of processes including, for example, removing non-hydrocarbon components and extracting natural gas liquids (NGL) from the natural gas.

As shown in FIG. 1, nitric oxide can be contacted with oxygen-containing natural gas in gas transportation system 14 at a plurality of injection points A–E. Although the temperatures and pressures in upstream gas line 18, midstream gas line 22, downstream gas line 30, and plant supply line 34 can vary greatly, the present invention can be employed effectively at each injection point A–E to remove oxygen from natural gas.

Injecting nitric oxide at injection point A can be advantageous because it removes oxygen from the natural gas stream immediately after lifting the natural gas to the surface. This allows a low-oxygen natural gas to be transported through virtually the entire gas transportation system 14, thereby reducing corrosion of virtually the entire gas transportation system 14.

It can, alternatively and/or additionally, be advantageous to inject nitric oxide at injection points B or C because fewer injection mechanisms are required than would be required when injecting nitric oxide at injection point A. In addition, injection points B and C remove oxygen from the natural gas in locations where a substantial portion of gas transportation system 14 would only be exposed to low-oxygen natural gas, thereby reducing corrosion of substantial portion of gas transportation system 14. Further, because the natural gas downstream of injection points B and C is pressurized to greater than atmospheric pressure, the risk of additional downstream air leaks is minimal. Injection point B is particularly advantageous because the nitric acid or ammonium nitrate produced downstream from the injection point B can be removed using existing gas/liquid separator 26, thereby eliminating the need for installing an additional separator.

It can, alternatively and/or additionally, be advantageous to inject nitric oxide at injection points D or E because only one nitric oxide injection system would be required per gas production field 10. Further, although the nitric oxide is contacted with the oxygen-containing natural gas outside gas processing plant 12, the resulting products could be separated from the natural gas using conventional equipment located within gas processing plant 12, thereby eliminating the need for installing an additional separator.

The gas production, transportation, and processing system shown in FIG. 1 is just one example of a simplified configuration used for illustration purposes only. Typically, each gas processing plant 12 is fed natural gas from a plurality of gas production fields 10. Further, gas transportation system 14 typically comprises a plurality of intermediate stage booster compressors, gas lines, and separators which, in the interest of brevity, are not shown in FIG. 1. The number of compressors, separators, and manifolds required between wellheads 16 and gas processing plant 12 is dictated by a variety of factors including, for example, the distance between wellheads 16 and gas processing plant 12, the size of the gas lines in gas transportation system 14, the quality of the gas lines in gas transportation system 14, and the power of the booster compressors.

Figure 2:
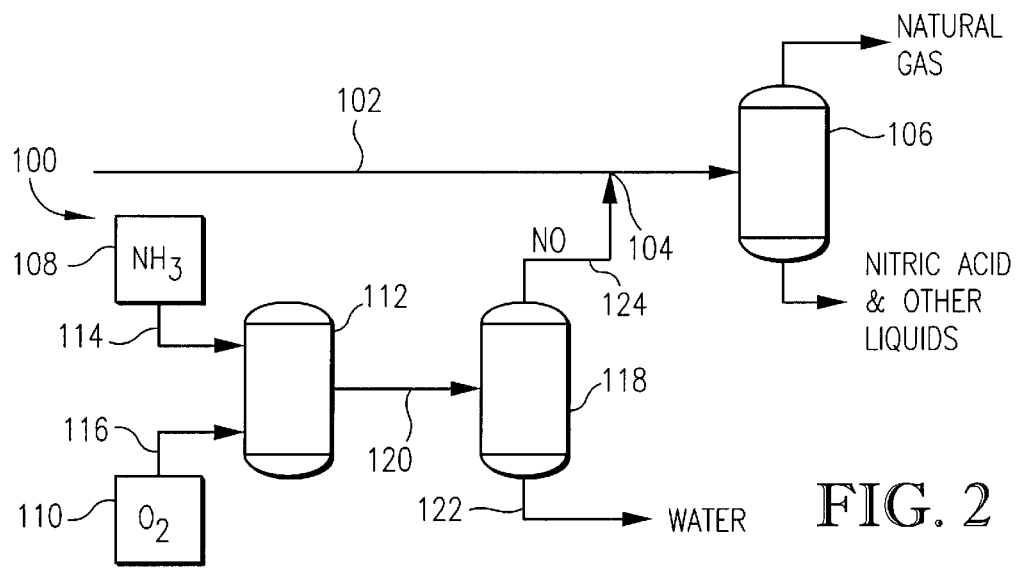
FIG. 2 is a process flow diagram showing a system for removing oxygen from natural gas.

Referring now to FIG. 2, a nitric oxide source 100 provides nitric oxide for injection into a natural gas line 102 by a nitric oxide injector 104. After injection, the nitric oxide reacts with oxygen in natural gas line 102 to form a nitrogen dioxide. The nitrogen dioxide can then react with water in natural gas line 102 to form nitric acid. A separator 106 separates the nitric acid, typically as a solution in water, from the natural gas.

Nitric oxide source 100 comprises an ammonia source 108, an oxygen source 110, and a reactor 112 for reacting ammonia and oxygen. Ammonia source 108 can be any suitable source of ammonia such as, for example, a tank of compressed liquid anhydrous ammonia. Oxygen source 110 can be any suitable source of oxygen, such as, for example, ambient air or a tank of compressed oxygen. The ammonia and oxygen are conducted from ammonia source 108 and oxygen source 110 to reactor 112 via lines 114 and 116. In reactor 112, ammonia is at least partially oxidized at elevated temperatures to produce nitric oxide and water. The effluent of reactor 112 can then be conducted directly to nitric oxide injector 104, not shown. Alternatively, the effluent of reactor 112 can be conducted through line 120 to a separator 118 where nitric oxide and water are separated. Separator 118 can be any device suitable for separating water from nitric oxide. Preferably, separator 118 is a gas/liquid phase separator. Water exits separator 118 via a line 122 and is disposed of in any suitable manner. Nitric oxide exits separator 118 via a line 124 and is conducted to nitric oxide injector 104 for injection into natural gas line 102.

Figure 3:
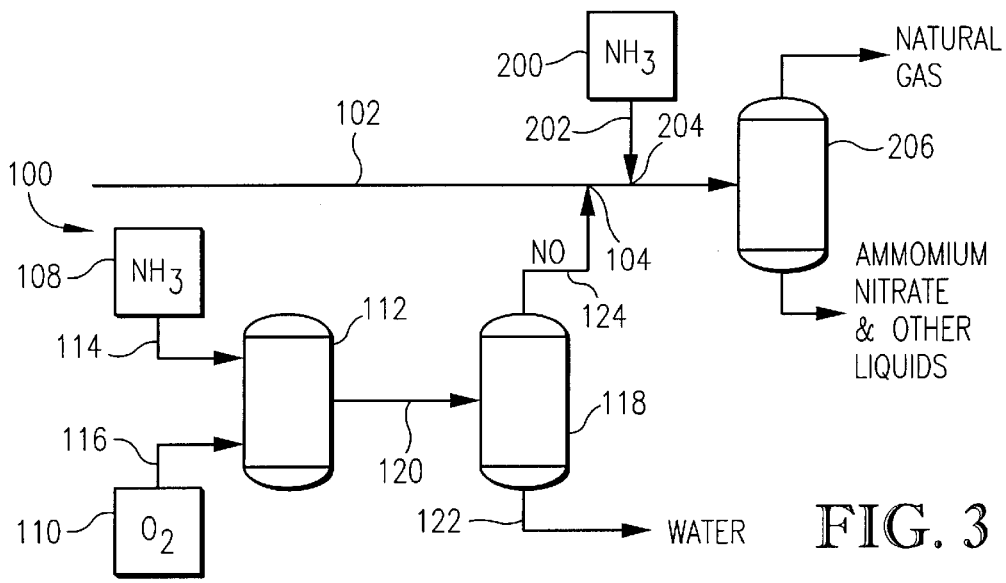
FIG. 3 is a process flow diagram showing an alternative system for removing oxygen from natural gas.

Referring to FIG. 3, an alternative embodiment of the present invention is shown. Nitric oxide source 100 comprises the same components shown in FIG. 1; however, in this embodiment, an additional ammonia source 200 is provided. Ammonia is conducted via a line 202 to natural gas line 102 where it is injected into gas line 102 by ammonia injector 204. Ammonia injector 204 is preferably located downstream from nitric oxide injector 104. Preferably, ammonia injector 204 is located sufficiently far downstream from nitric oxide injector 104 so that the reaction of nitrogen dioxide and water to form nitric acid is substantially complete at ammonia injector 204. When ammonia is injected into natural gas line 102 at ammonia injector 204, the ammonia reacts with the nitric acid present in natural gas line 102 to form ammonium nitrate. A separator 206 is provided downstream from ammonia injector 204 for separating ammonium nitrate from natural gas. Separator 206 can be any device suitable for separating ammonium nitrate from natural gas. Preferably, separator 206 is a gas/liquid phase separator.

Figure 4:
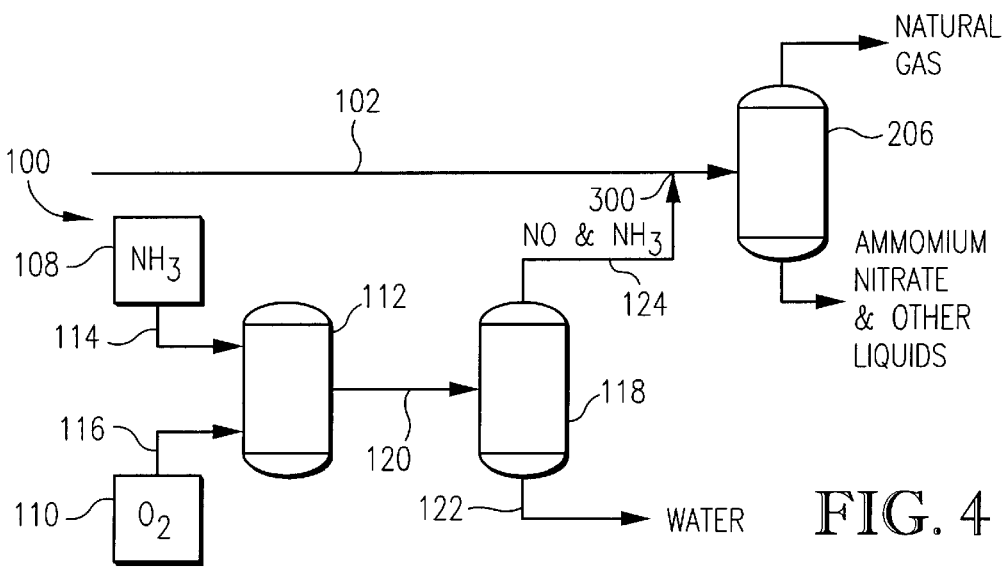
FIG. 4 is a process flow diagram showing an alternative system for removing oxygen from natural gas.

Referring now to FIG. 4, an alternative embodiment of the invention is shown. Nitric oxide source 100 comprises the same components shown in FIGS. 2 and 3; however, in this embodiment, excess ammonia is reacted with oxygen in reactor 112. The unreacted ammonia is injected along with nitric oxide into natural gas line 102 by a nitric oxide/ammonia injector 300. Between injector 300 and separator 206, the following reactions take place, (1) oxygen reacts with nitric oxide to form nitrogen dioxide, (2) nitrogen dioxide reacts with water to form nitric acid, and (3) nitric acid reacts with ammonia to form ammonium nitrate. Separator 206 is operable to separate ammonium nitrate from natural gas.

Now referring to FIGS. 1–4, injectors 104 and 300, shown in FIGS. 2–4, can be located at any or all of injection points A–E, shown in FIG. 1. Separators 106 and 206, shown in FIGS. 2–4, can be gas/liquid separator 26, shown in FIG. 1, any gas/liquid separator in gas transportation system 14, or standard separators located in gas processing plant 12. Alternatively, separators 106 and 206 can be additional separators added to the system shown in FIG. 1.

The present invention is effective to reduce the level of oxygen in the natural gas stream to less than 50 ppmv, preferably less than 20 ppmv.

EXAMPLE

In this example, nitric oxide was injected into a nitrogen-filled cell with a 10 centimeter path length at ambient temperature and pressure. No oxygen was injected into the cell, however, it was observed that nitric oxide immediately began to react with oxygen which was present either as an impurity in the nitrogen or due to a leak in the cell.

Figure 5:
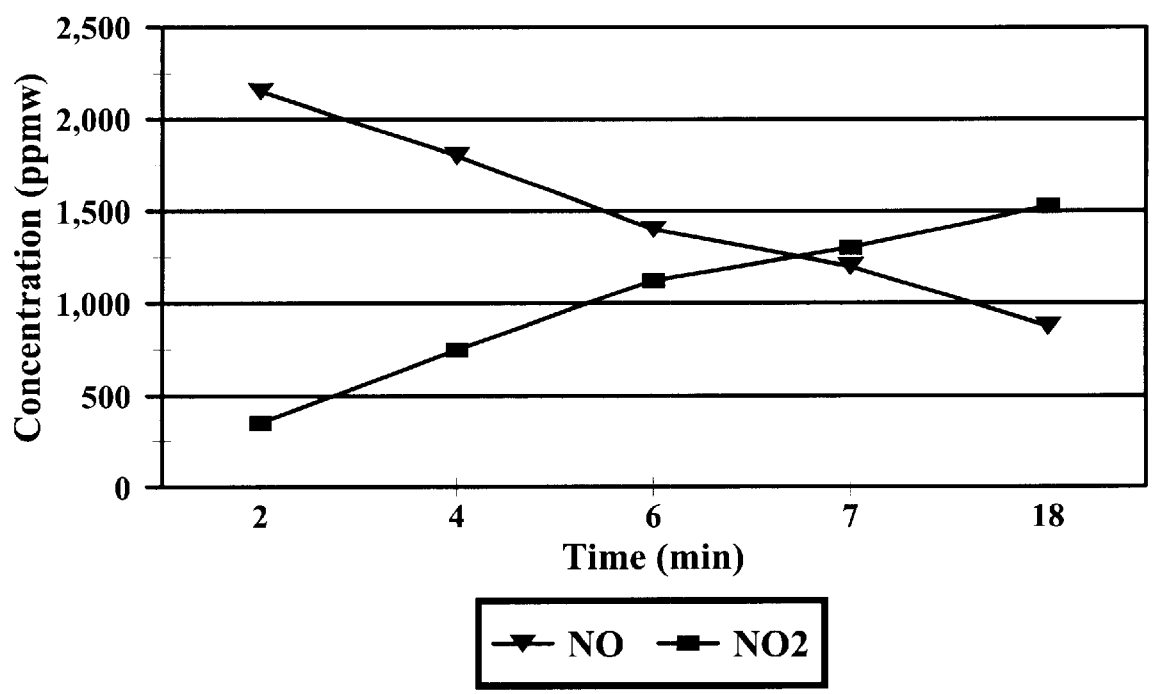
FIG. 5 is a chart plotting nitric oxide consumption and nitrogen dioxide production as a function of time.

The concentrations of nitric oxide and nitrogen dioxide in the cell were measured over time using an infrared measuring device. Table 1, below, shows the concentrations of nitric oxide and nitrogen dioxide in the cell at various sample times. FIG. 5 plots the nitric oxide and nitrogen dioxide concentrations of Table 1 as a function of time.

TABLE 1

| Time (min) | NO Concentration (ppmw) | $NO_2$ Concentration (ppmw) |
|---|---|---|
| 2 | 2,150 | 350 |
| 4 | 1,800 | 750 |
| 6 | 1,400 | 1,125 |
| 7 | 1,200 | 1,300 |
| 18 | 875 | 1,525 |

As can be seen in Table 1 and FIG. 5, at ambient temperature and pressure, nitric oxide is consumed by reaction with oxygen to form nitrogen dioxide.

While this invention has been described in terms of the presently preferred embodiments, reasonable variations and modifications are possible to those skilled in the art and such variations are within the scope of the described invention and the appended claims.

What is claimed is:

1. A method of removing oxygen from natural gas, said method comprising the step of:

(a) contacting a volume of oxygen-containing natural gas with nitric oxide under conditions sufficient to produce nitrogen dioxide.

2. A method according to claim 1, wherein said volume of oxygen-containing natural gas contains more than 50 ppmv of oxygen.

3. A method according to claim 1, wherein said volume of oxygen-containing natural gas contains from 50 ppmv to 10,000 ppmv of oxygen.

4. A method according to claim 1, wherein said volume of oxygen-containing natural gas contains from 100 ppmv to 2,000 ppmv of oxygen.

5. A method according to claim 1, further comprising the step of:

(b) separating said volume of natural gas into a gas-phase component and a liquid-phase component.

6. A method according to claim 5, wherein said liquid-phase component comprises nitric acid.

7. A method according to claim 5, wherein said liquid-phase component comprises ammonium nitrate.

8. A method according to claim 1, wherein the conditions under which step (a) is performed include a temperature from 0° F. to 200° F. and a pressure from 0 psig to 2000 psig.

9. A method according to claim 1, wherein, in step (a), from 0.5 moles to 10 moles of nitric oxide are contacted with said volume of oxygen-containing natural gas per mole of oxygen in said volume of oxygen-containing natural gas.

10. A method according to claim 1, wherein step (a) takes place in a natural gas pipeline.

11. A method of removing oxygen from a natural gas stream, said method comprising the steps of:

(a) charging an oxygen-containing natural gas stream to a pipeline for transporting said oxygen-containing natural gas stream;

(b) injecting nitric oxide into said pipeline; and (c) separating a liquid-phase component out of the natural gas.

12. A method according to claim 11, wherein said oxygen-containing natural gas stream contains from 50 ppmv to 10,000 ppmv of oxygen.

13. A method according to claim 12, wherein said oxygen-containing natural gas stream comprises more than 70 weight percent methane.

14. A method according to claim 13, wherein, in step (b), from 0.5 moles to 10 moles of nitric oxide are injected in said pipeline per mole of oxygen in said oxygen-containing natural gas stream.

15. A method according to claim 13, wherein said liquid-phase component comprises nitric acid.

16. A method according to claim 13, wherein said liquid-phase component comprises ammonium nitrate.

* * * * *